United States Patent [19]

Iguchi

[11] Patent Number: 4,874,276
[45] Date of Patent: Oct. 17, 1989

[54] FASTENER

[75] Inventor: Tatsuya Iguchi, Toyota, Japan

[73] Assignee: Nifco, Inc., Yokohama, Japan

[21] Appl. No.: 241,432

[22] Filed: Sep. 7, 1988

[30] Foreign Application Priority Data

Sep. 14, 1987 [JP] Japan .............................. 61-140483[U]

[51] Int. Cl.$^4$ ............................................. F16B 13/04
[52] U.S. Cl. ........................................ 411/48; 411/41;
411/60; 24/297; 24/607; 403/408.1; 403/388
[58] Field of Search ........................ 411/41, 44, 48, 60,
411/57; 24/453, 297, 326, 606, 607; 403/408.1, 388

[56] References Cited

U.S. PATENT DOCUMENTS

| | | | |
|---|---|---|---|
| 3,352,195 | 11/1967 | Fisher | 24/453 |
| 3,606,814 | 9/1971 | MacKenzie | 411/60 |
| 4,276,806 | 7/1981 | Morel | 411/41 |
| 4,358,234 | 11/1982 | Takegawa | 411/57 |
| 4,375,342 | 3/1983 | Wollar | 411/41 |

FOREIGN PATENT DOCUMENTS

| | | | |
|---|---|---|---|
| 248728 | 4/1963 | Australia | 411/46 |
| 476213 | 4/1974 | Australia | 411/60 |
| 1006076 | 3/1977 | Canada | 411/60 |

OTHER PUBLICATIONS

Nylatch ® catalogue.

Primary Examiner—Gary L. Smith
Assistant Examiner—Flemming Saether
Attorney, Agent, or Firm—Schwartz & Weinrieb

[57] ABSTRACT

A fastener includes a cylindrical outer member and an insertion member. The cylindrical outer member has a cylindrical portion with an axial bore, and a flange portion provided at one end of the cylindrical portion. The cylindrical portion tapers toward the other end thereof and includes a plurality of arially extending notches, a plurality of inner projections formed upon inner surfaces of the end portion, and elastically deformable locking pieces projecting obliquely outwardly from an intermediate portion thereof toward the flange portion. The insertion member has a large-diameter portion for disposition within the axial bore of the cylindrical portion. The cylindrical portion is expanded radially outwardly by inserting the insertion member into the axial bore of the cylindrical outer member from the flange portion end thereof and by bringing the large-diameter portion into engagement with the inner projections of the cylindrical portion of the insertion member.

13 Claims, 6 Drawing Sheets

FASTENER

This invention relates to a plastic fastener for fastening together a plurality of plate like objects.

DESCRIPTION OF THE PRIOR ART

Heretofore, a fastener comprising a cylindrical outer member having a cylindrical portion capable of being radially expanded and a flange, and an insertion member has been used to fasten together two plates such that the plates are inseparable. To fasten together two plates by using this prior art fastener, the two plates are overlapped with their fastener insertion holes aligned with respect to each other, and then the cylindrical portion of the outer member is inserted through the aligned fastener insertion holes until the flange of the outer member comes into contact with one of the overlapped plates. Then, the insertion member is inserted through an axial bore defined within the outer member so as to radially expand the cylindrical portion thereof, thus clamping the two plates between the expanded cylindrical portion and the flange such that the two plates cannot be separated from each other.

However, when fastening together two plates or other similar objects objects by using such a fastener, the fastening operation usually has to be effected at a large number of positions if the plate-like objects have large surface areas such as in the case of mounting a plate-like insulator upon the back side of an automobile trunk lid. In particular, the fastening operation conventionally comprises process steps wherein the fastener insertion holes of the two plates or the like are aligned at a large number of positions, the outer member of each fastener is inserted within the aligned holes, and then the insertion member thereof is inserted within the outer member, and thus the fastening operation is very cumbersome. The efficiency of the fastening operation can be greatly improved by preliminarily mounting the fastener within each of a large number of fastener insertion holes of one of the plates and then fastening the other plate by inserting the mounting fasteners into the fastener insertion holes of the other plate.

FIGS. 13 to 17 show a prior art fastener having a structure for being preliminarily mounted within the fastener insertion hole of one of the two plates to be fastened together (disclosed in Japanese Utility Model Publication No. SHO 57-4244).

In FIGS. 13 to 17, reference numeral 10 designates a cylindrical outer member having a cylindrical portion 1 with an axial bore 1a and which is capable of being radially expanded, and also having a flange portion 2 integral with one end of the cylindrical portion 1. The cylindrical portion 1 has a plurality of axially extending notches 3 open at its end opposite flange 2. The cylindrical portion 1 also has a plurality of inner projections 3' provided adjacent to the noted opposite end.

The cylindrical portion 1 also has an annular recess 4 formed within the outer periphery of a stem portion adjacent to the flange portion 2.

Denoted by reference numeral 20 is an insertion member which has a flange portion 11 and a pin-like portion 12. The pin-like portion 12 has a plurality of projections 13 formed adjacent to the distal end thereof for guiding it along the notches 3 of the outer member 10.

With this prior art fastener, the cylindrical portion 1 of the outer member 10 is first inserted by inwardly flexing it into a fastener insertion hole A1 of one plate (hereinafter referred to as the first plate) A, whereby the edge of the fastener insertion hole A1 is fitted within the annular recess 4.

Then, the insertion member 20 is inserted into the axial bore 1a of the outer member 1 so as to achieve an intermediate axial position with respect to the cylindrical portion 1.

In this way, the fastener is preliminarily mounted within each of a large number of fastener insertion holes A1 of the first plate A.

Then, as shown in FIG. 14, each fastener insertion hole B1 of the other plate (hereinafter referred to as the second plate) B is aligned with the cylindrical portion 1 of the mounted outer member 10 of each fastener, and then the outer member 10 is inserted through the fastener insertion hole B1 as shown in FIG. 15.

Then, as shown in FIG. 16, the insertion member 20 is pushed until its free end projects from the free or distal end of the cylindrical portion 1 as shown in FIG. 16. As a result, the pin-like portion 12 of the insertion member 20 engages with the inner projections 3' so as to radially expand the cylindrical portion 1. The cylindrical portion 1 is thus strongly urged against the edge wall defining the fastener insertion hole B1 of the second plate B, and the expanded cylindrical portion 1 projects outwardly beneath the lower surface of the second plate B. In this way, the two plates A and B are fastened together such that they are incapable of separation.

With the prior art fastener having the above structure, however, the edge of the fastener insertion hole A1 of the first plate A is locked within the annular recess 4 of the cylindrical portion 1. Therefore, the inner diameter of the fastener insertion hole A1 of the first plate A has to be such so as to be smaller than the outer diameter of the cylindrical portion 1, that is, smaller than the fastener insertion hole B1 of the second plate B. Furthermore, the annular groove 4 cannot be very deep due to mechanical strength limitations; that is, the gap defined between the fastener insertion hole A1 and the annular recess 4 during the mounted state of the outer member 10 within the plates cannot be made very large.

In the case where the first and second plates A and B have a large surface area and are to be fastened together at a larger number of positions as in the case of fastening a plate-like insulator to the back surface of an automobile trunk lid, it is difficult to form the large number of the fastener insertion holes A1 and B1 of the first and second plates A and B at a perfectly constant pitch. Therefore, at some positions there occurs a center-to-center deviation of the mating fastener insertion holes A1 and B1, as shown in FIG. 17, although the mating holes are aligned with respect to each other at other positions.

Where there is a center-to-center deviation between the fastener insertion holes A1 and B1, since the fastener insertion hole A1 of the first plate A is smaller than fastener insertion hole B1 of the second plate B and also the gap defined between the fastener insertion hole A1 and annular recess 4 is small, there are cases in which the cylindrical portion 1 of the outer member 10 mounted within the fastener insertion hole A1 of the first plate A cannot be inserted into the fastener insertion hole B1 of the second plate B.

OBJECT OF THE INVENTION

An object of the invention is to provide a plastic fastener which can readily and reliably fasten together two plates by accommodating any center-to-center deviation between the fastener insertion holes of the first and second plates.

SUMMARY OF THE INVENTION

According to the invention, there is provided a fastener comprising a cylindrical outer member and an insertion member, the cylindrical outer member having a cylindrical portion with an axial bore open at both ends thereof, a flange portion provided at one end of the cylindrical portion, the cylindrical portion having an end portion provided with a plurality of axially extending notches open at the other end thereof, a plurality of inner projections provided upon the inner surface of the end portion of the cylindrical portion and elastically deformable locking pieces projecting obliquely outwardly from an intermediate portion and extending of the cylindrical portion toward the flange portion, the insertion member having a large-diameter portion adapted to be disposed within the axial bore of the cylindrical portion, the cylindrical portion being radially expanded outwardly by inserting the insertion member into the axial bore of the cylindrical outer member from the side of the flange portion of the insertion member and bringing the large-diameter portion into engagement with the inner projections of the cylindrical portion.

With the fastener having the above construction, when inserting the outer member through a fastener insertion hole of a first plate, the locking pieces projecting obliquely outwardly toward the flange portion clear the fastener insertion hole by being urged radially inwardly by means of the edge of the fastener insertion hole of the first plate and after clearing the fastener insertion hole elastically restored to their initial state so as to be located outside of the edge of the fastener insertion hole and beneath the undersurface of the first plate. By subsequently inserting the insertion member through the outer member to an intermediate axial position with respect to the cylindrical portion, the outer member is inseparably mounted within the fastener insertion hole of the first plate.

Then, by pushing the cylindrical portion of the mounted outer member through a fastener insertion hole of a second plate, the locking pieces engage the edge of the fastener insertion hole of the second plate and are biased radially inwardly to a state in which they are held by means of the inner wall of the fastener insertion hole of the second plate.

As the insertion member is pushed still further into the cylindrical outer member the larger diameter portion thereof, strikes the inner projections provided upon the end of the cylindrical portion so as to expand the cylindrical portion radially outwardly. Thus, the cylindrical portion is urged against the inner wall of the fastener insertion hole of the second plate and projects radially outwardly with respect to the lower surface thereof.

Consequently, the flange portion of the outer member is held in contact with the outer surface of the first plate while the expanded portion of the cylindrical portion projects radially outwardly with respect to the edge of the fastener insertion hole of the second plate. Thus, the two plates are inseparably fastened together.

In this way, with the fastener preliminarily mounted within the fastener insertion hole of the first plate the locking pieces projecting radially outwardly from the cylindrical portion are located radially outwardly of the edge of the fastener insertion of the first plate so that the fastener is held inseparably within the fastener insertion hole. Since the fastener insertion hole of the first plate can have a diametrical extent which is greater than that of the fastener insertion hole of the second plate, any deviation between the centers of the fastener insertion holes of the first and second plates can be accommodated when the two plates are fastened together.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 1:
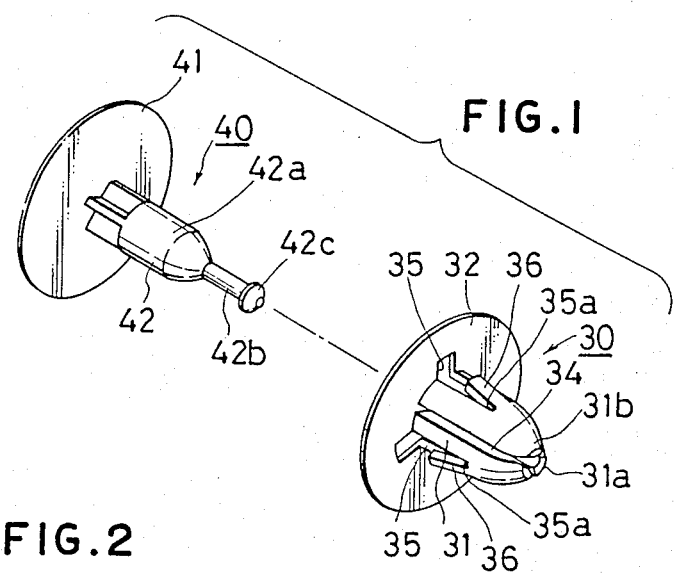
FIG. 1 is an exploded perspective view showing an embodiment of the fastener according to the invention with an outer member and an insertion member shown separately.
Figure 2:
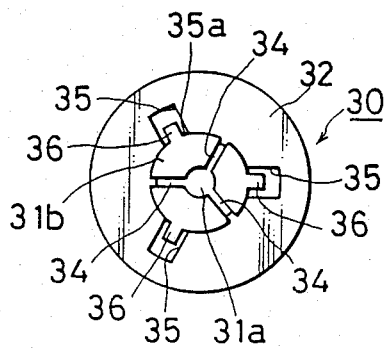
FIG. 2 is a bottom view showing the outer member shown in FIG. 1.

FIGS. 1 to 4 illustrate an embodiment of the fastener according to the invention. This fastener consists of a cylindrical outer member 30 and an insertion member 40. These members are both one-piece plastic moldings.

The outer member 30 includes a cylindrical portion 31 having an axial bore 31a open at both ends and a disk-like flange portion 32 provided at one end.

Figure 4:
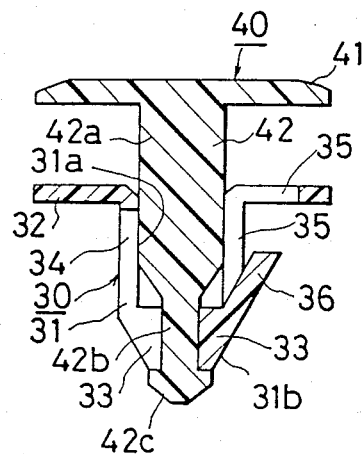
FIG. 4 is a sectional view taken along line IV—IV in FIG. 3.

The cylindrical portion 31 has a conical end portion 31b pointed toward the free end disposed opposite flange portion 32, and the end portion 31b has a plurality of inwardly extending projections 33 (FIG. 4).

The cylindrical portion 31 has three axially extending notches 34 open at the free end and circumferentially trisecting it. Each section of the cylindrical portion 31 tri-sected by means of the three notches 34 has a notch 35 extending axially toward the flange portion 32 and the notches continue radially within the flange portion 32. An elastically deformable locking piece 36 extends obliquely outwardly from the center of the edge 35a of each notch 35 at the lowermost end portion thereof defined within conical end portion 31b.

The insertion member 40 has a pin-like portion 42 and a flange portion 41 provided at one end of the pin-like portion 42.

The pin-like portion 42 has a large-diameter portion 42a depending from the underside of the flange portion 41, a small-diameter portion 42b integrally formed with the large diameter portion 42a and extending therebelow toward the free or distal end of the insertion member 40, and a head portion 42c at the free or distal end thereof. The large-diameter portion 42a has an outer diameter which is substantially equal to the inner diameter of the axial bore 31a of the outer member 30. The small-diameter portion 42b has an outer diameter which is substantially equal to the inner diameter of the inner projections 33.

The fastener having the above construction is used to fasten together two plate-like objects in the manner as will be described hereinunder.

Figure 5:
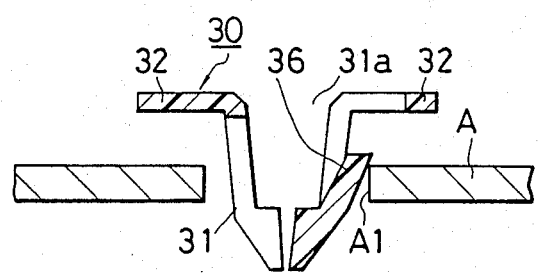
FIG. 5 is a sectional view showing the outer member inserted through a fastener insertion hole of a first plate.
Figure 6:
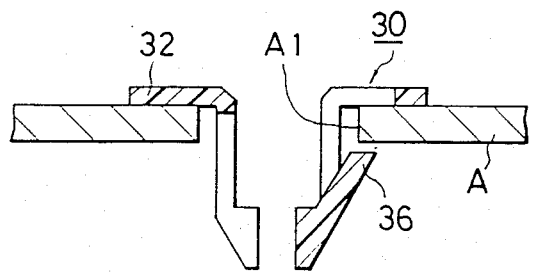
FIG. 6 is a sectional view showing the outer member mounted within the first plate.

First, the outer member 30 is mounted within a fastener insertion hole A1 of a first plate A. At this time, the three locking pieces 36 projecting obliquely outwardly from the cylindrical portion 31 engage with the edge of the hole A1. As a result of further insertion of the outer member 30 through the hole A1 of plate A, the locking pieces 36 clear the hole A1 as a result of inward flexing of the cylindrical portion 31 and the three locking pieces 36 achieve the positions as shown in FIGS. 5 and 6. When the hole A1 is cleared, the cylindrical portion 31 and the three locking pieces 36 elastically restored to their initial states as shown in FIG. 6.

Figure 7:
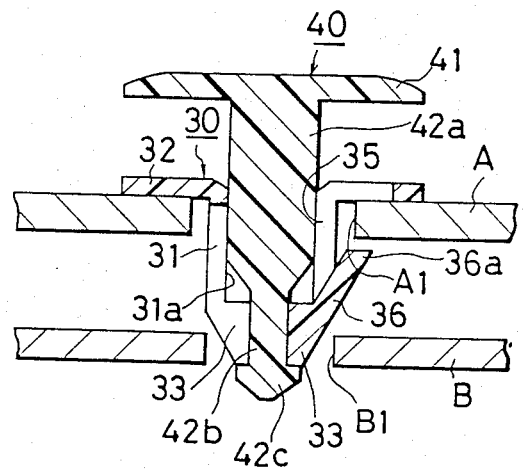
FIG. 7 is a sectional view for explaining the fastening of the second plate by inserting the insertion member into the outer member shown in FIG. 6.

Then, the pin-like portion 42 of the insertion member 40 is inserted into the outer member 30 until its head portion 42c projects outwardly from the free end of the cylindrical portion 31. As shown in FIG. 7, the large-diameter portion 42a of portion 42 is located within the axial bore 31a of cylindrical portion 31, and the small-diameter portion 42b of portion 42 is located within the inner projections 33 at the free end of the cylindrical portion 31. in this state, the cylindrical portion 31 cannot be deformed inwardly as was characteristic of its state shown in FIG. 5.

Thus, the free end 36a of each of the three locking pieces 36 is disposed radially outwardly beneath the lower surface of the first plate A so as to surround the fastener insertion hole A1. The fastener is thus securely mounted within the fastener insertion hole A1 of the first plate A.

Figure 8:
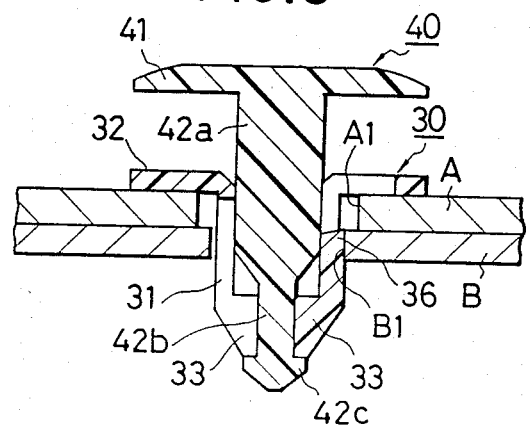
FIG. 8 is a sectional view showing the outer member inserted through the fastener insertion hole of the second plate.

Then, as shown in FIG. 8, the cylindrical portion 31 is inserted into the fastener insertion hole B1 of the second plate B. At this time, the three locking pieces 36 are contacted by means of the edge of the fastener insertion hole B1 so as to be flexed radially inwardly toward the notches 35 and are in contact with the inner wall defining the fastener insertion hole B1.

Figure 9:
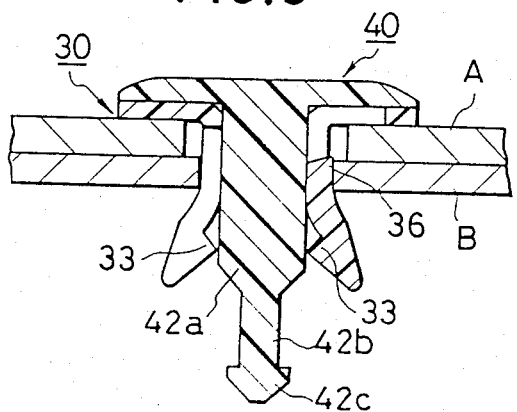
FIG. 9 is a sectional view showing the fastener having fastened together the first and second plates by fully inserting the insertion member into the outer member.

Then, as shown in FIG. 9, the insertion member 40 is inserted into the outer member 30 until the flange portion 41 of insertion member 40 is brought into contact with the flange portion 32 of the outer member 30. Thus, the large-diameter portion 42a engages the inner projections 33 of the cylindrical portion 31, so that the cylindrical portion 31 is radially expanded as permitted by means of the provision of the axially extending notches 34 and strongly urged into contact with the inner wall defining the fastener insertion hole B1 of the second plate B, while it additionally projects radially outwardly beneath the second plate B. The two plates A and B are thus fastened together such that they cannot be separated from each other.

In order to remove the first plate A from the second plate B, the insertion member 40 is removed from the outer member 30 in a manner reversing the insertion steps leading up to the state of FIG. 9. Then, the fastener is removed from the fastener insertion hole B1. Then, the outer member 30 is removed from the fastener insertion hole A1 by causing inward flexing of the cylindrical portion 31 and locking pieces 36.

As has been shown, the locking pieces 36 project obliquely outwardly from the cylindrical portion 31 of the outer member 30. Thus, when the outer member 30 is preliminarily mounted as shown in FIG. 7, it will not be detached from the first plate A due to the presence of the free ends 36a of the locking pieces 36. Thus, the fastener insertion hole A1 of the first plate A may have a diametrical extent which is greater than that of the fastener insertion hole B1 of the second plate B as shown in FIG. 7.

Figure 10:
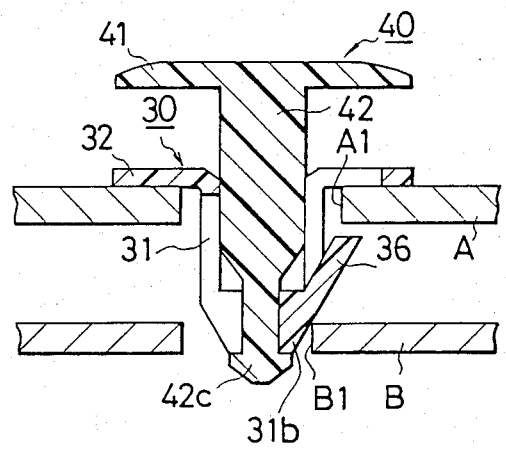
FIG. 10 is a sectional view showing the outer member inserted through the fastener insertion hole of the first plate and with respect to a misaligned fastener insertion hole of the second plate.

Therefore, even if there is a center-to-center deviation between the fastener insertion holes A1 and B1 of the first and second plates A and B as shown in FIG. 10, when fastening together plate-like objects having a large surface area at a large number of positions as in the case of mounting a plate-like insulator (first plate) upon an automobile trunk lid (second plate), such deviation can be absorbed accommodated because the fastener insertion hole A1 of the first plate A has a diametrical extent which is greater than that of the fastener insertion hole B1 of the second plate B and also because a large gap is defined between the outer periphery of the cylindrical portion 31 and the fastener insertion hole A1.

Figure 11:
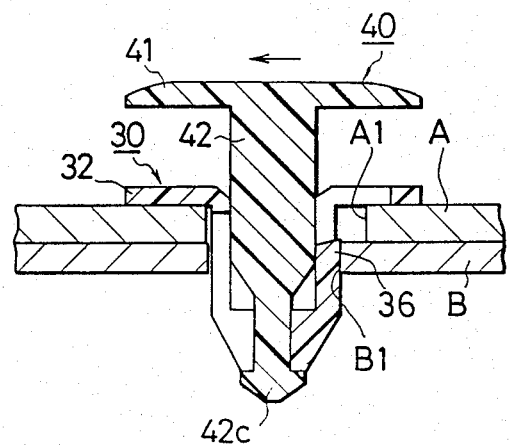
FIG. 11 is a sectional view showing the outer member inserted through misaligned fastener insertion holes of the two plates.
Figure 12:
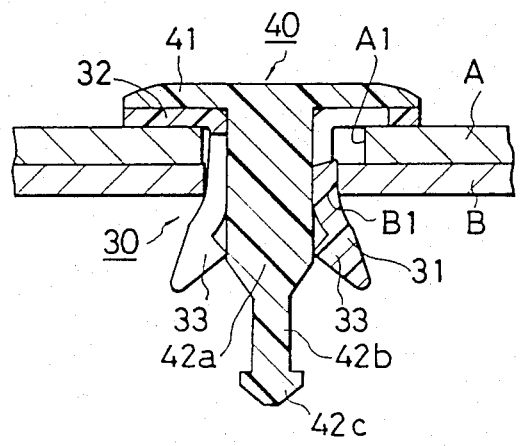
FIG. 12 is a sectional view showing the fastener having fastened together two plates by inserting the insertion member through the outer member which is disposed within the misaligned fastener insertion holes of the two plates.
Figure 13:
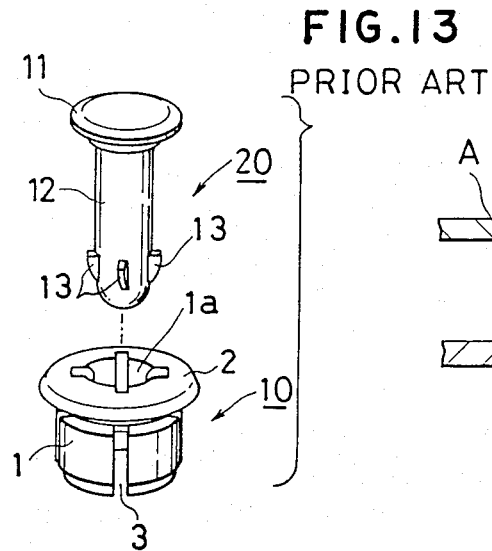
FIG. 13 is an exploded perspective view showing a well-known fastener with an outer member and an insertion member shown separated from each other.
Figure 14:
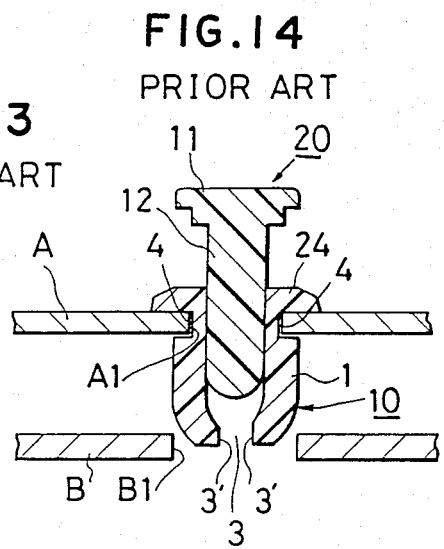
FIG. 14 is a sectional view showing the outer member of FIG. 13 inserted through a fastener insertion hole of a first plate.
Figure 15:
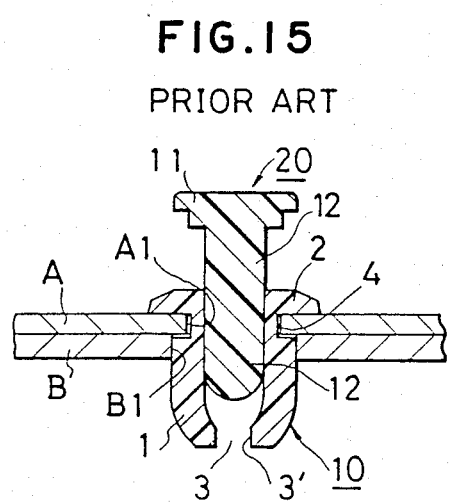
FIG. 15 is a sectional view showing the outer member of FIG. 14, with a second plate disposed in a position so as to be fastened to the first plate.
Figure 16:
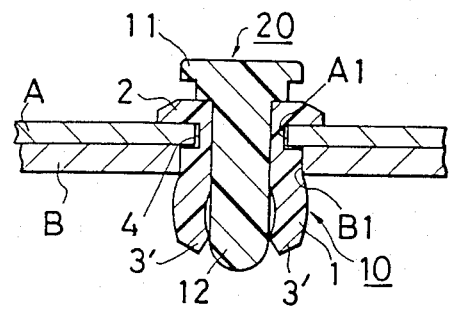
FIG. 16 is a sectional view showing the fastener having fastened two plates together by inserting the insertion member through the outer member.
Figure 17:
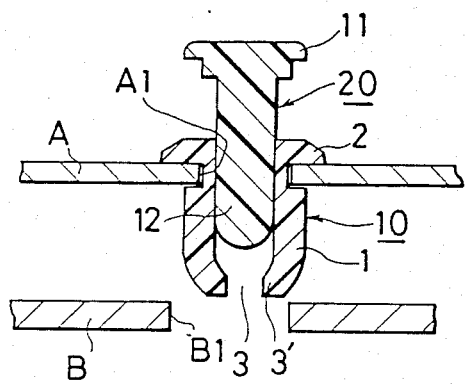
FIG. 17 is a sectional view showing two plates having misaligned fastener insertion holes.

Even if the fastener insertion hole B1 is disposed toward the left to the fastener insertion hole A1 as shown in FIG. 10, by pushing the cylindrical portion 31 of fastener into the hole B1 the conical end portion 31b of the cylindrical portion 31 engages with the right edge portion of the hole B1. Since the hole A1 is larger in diameter than the hole B1 and there is a large gap defined between the inner peripheral wall of hole A1 and the cylindrical portion 31, the fastener is moved within the hole A1 toward the left to the state as shown in FIG. 11. Thus, by subsequently pushing the insertion member 40 fully into the outer member 30 the two plates A and B can be fastened together even if there is a deviation between the two fastener insertion holes A1 and B1.

Figure 3:
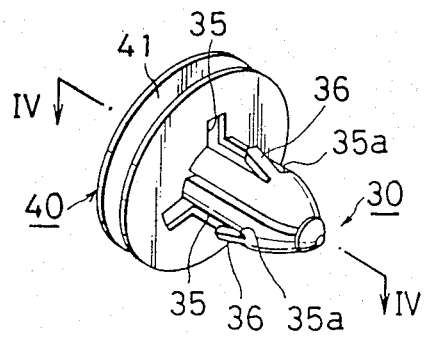
FIG. 3 is a perspective view showing the outer member and insertion member coupled together.

In the above explanation with reference to FIGS. 5 to 7, the outer member 30 is first mounted within the first plate A before inserting the insertion member 40 therethrough. However, by first coupling the two members so as to achieve the state as shown in FIGS. 3 and 4 and then inserting them through the fastener insertion hole A1 of the first plate A so as to cause inward flexing of the locking pieces 36 into the notches 35, the mounted state as shown in FIG. 7 can be obtained.

While an embodiment of the invention has been described, this embodiment is by no means limitative, and various changes and modifications are possible in the construction of various parts of the fastener of the present invention. For example, the flange portion 41 of the insertion member 40 may be omitted. Furthermore, the outer member 30 may have a different number of axially extending notches 34, and the locking pieces 36 may have different shapes.

As has been described in the foregoing, the fastener according to the invention is preliminarily mounted within the fastener insertion hole of the first plate by means of the locking pieces projecting outwardly from the cylindrical portion of the outer member. Thus, the fastener insertion hole of the first plate may be made larger in diameter than the fastener insertion hole of the second plate, which is properly engaged and secured as a result of the radial expansion of the cylindrical portion of the outer member. This means that, unlike the prior art fastener any deviation between the fastener insertion holes of the first and second plates may be accommodated, and the fastener can be reliably mounted within the plates.

In view of the aforenoted possible variatios and modifications, it is therefore to be understood that within the scope of the appended claims, the present invention may be practiced otherwise than as specifically described herein.

What is claimed is:

1. A fastener, for securing together first and second panel members having first and second hole means, wherein said first hole means has a diametrical extent greater than the diametrical extent of said second hole means and having predetermined axes, respectively defined therein and through which said fastener is to be passed so as to secure said first and second panel members together, comprising:

a substantially cylindrical outer member defined by means of a substantially cylindrical body portion having a longitudinal axis and an external diametrical extent which is substantially less than the diametrical extent of said first hole means defined within said first panel member so as to permit lateral adjustable movement of said substantially cylindrical outer member and said fastener in a transverse direction with respect to said longitudinal axis of said substantially cylindrical outer member and relative to said first panel member; an axial bore defined within said substantially cylindrical body portion of said substantially cylindrical outer member; a flange portion provided upon a first end of said substantially cylindrical body portion for engagement with a first front surface of said first panel member; a plurality of axially extending notches defined within sidewall portions of said substantially cylindrical body portion of said substantially cylindrical outer member so as to extend along sidewall portions of said substantially cylindrical body portion which are intermediate said first end of said substantially cylindrical body portion and a second opposite end of said substantially cylindrical body portion; a plurality of elastically deformable cantilevered locking pieces integrally connected at one end thereof to said substantially cylindrical body portion of said substantially cylindrical outer member within the vicinity of end portions of said notches which are disposed toward said second end of said substantially cylindrical body portion of said substantially cylindrical outer member so as to have free end portions thereof projecting obliquely outwardly, respectively, from said notches toward said first flanged end of said substantially cylindrical body portion of said substantially cylindrical outer member, wherein said free end portions of said locking pieces are axially spaced a predetermined distance from said first flanged end of said substantially cylindrical body portion so as to permit said first panel member to be accommodated between said flanged end of said substantially cylindrical body portion and said free end portions of said locking pieces with said free end portions of said locking pieces freely disposed out of contact with a second rear surface of said first panel member so as not to interfere with said lateral adjustable movement of said substantially cylindrical outer member and said fastener in said transverse direction relative to said first panel member, and wherein further said free end portions of said locking pieces have outer surface portion means for engaging inner sidewall portions of said hole means defined within said second panel member such that when said axes of said first and second hole means of said first and second panel members are misaligned when said substantially cylindrical outer member and said fastener, mounted within said first panel member, are to be passed through said second panel member, said inner sidewall portions of said hole means of said second panel member will force said substantially cylindrical outer member and said fastener to move laterally within said hole means of said first panel member so as to permit said substantially cylindrical outer member and said fastener to be inserted through said second hole means of said second panel member; and a plurality of projections formed upon said second opposite end of said substantially cylindrical body portion and projecting substantially radially inwardly within said axial bore; and an insertion member for disposition within said axial bore of said substantially cylindrical outer member and for engaging said inwardly extending projections of said substantially cylindrical body portion of said substantially cylindrical outer member so as to expand said second opposite end of said substantially cylindrical body portion of said fastener radially outwardly with respect to a rear surface of said second panel member so as to engage said rear surface of said second member thereby securing said second panel member to said first panel member.

2. The fastener according to claim 1, wherein:
said insertion member has a flange portion provided at one end thereof for engaging and seating upon said flanged portion of said substantially cylindrical outer member when said insertion member is disposed within said axial bore of said substantially cylindrical outer member so as to radially expand said second opposite end of said substantially cylindrical body portion of said substantially cylindrical outer member.

3. The fastener as set forth in claim 1, wherein:
said substantially cylindrical outer member and said insertion member comprise one-piece plastic moldings.

4. The fastener as set forth in claim 1, further comprising:
a plurality of slit means defined within said substantially cylindrical body portion of said substantially cylindrical outer member for dividing said substantially cylindrical body portion into flexibly expandable body sections.

5. The fastener as set forth in claim 4, wherein:
three slit means are defined within said substantially cylindrical body portion of said substantially cylindrical outer member so as to divide said substantially cylindrical body portion into three equal body sections.

6. The fastener as set forth in claim 1, wherein:
said insertion member comprises a first body portion having a diametrical extent which is substantially equal to the diametrical extent of said axial bore defined within said substantially cylindrical body portion of said substantially cylindrical outer member; a tapered end portion having a diametrical extent which is greater than the diametrical extent defined between said inner projections of said substantially cylindrical body portion when said substantially cylindrical body portion is disposed in a non-expanded state; and a second body portion interposed between and interconnecting said first body portion and said tapered end portion and having a diametrical extent which is less than said diametrical extent of said first body portion and which is substantially equal to said diametrical extent defined between said inner projections of said substantially cylindrical body portion when said substantially cylindrical body portion is disposed in said non-expanded state so as to accommodate said inner projections within said non-expanded state whereby said insertion member is lockingly secured within said substantially cylindrical outer member.

7. A fastener system for securing two panel members together, comprising:
a first panel member having first hole means, having a first predetermined diametrical extent and having a first predetermined axis, defined therein for reception of a fastener to be used to secure said first panel member to a second panel member; and
a second panel member having second hole means, having a second predetermined diametrical extent which is less than said diametrical extent of said first hole means and having a second predetermined axis, defined therein for reception of said fastener to be used to secure said first and second panel members together, wherein said fastener comprises
a substantially cylindrical outer member defined by means of a substantially cylindrical body portion having a longitudinal axis and an external diametrical extent which is substantially less that the diametrical extent of said first hole means defined within said first panel member so as to permit lateral adjustable movement of said substantially cylindrical outer member and said fastener in a transverse direction with respect to said longitudinal axis of said substantially cylindrical outer member and relative to said first panel member; an axial bore defined within said substantially cylindrical body portion of said substantially cylindrical outer member; a flange portion provided upon a first end of said substancylindrical body portion of said substantially cylindrical outer member for engagement with a first front surface of said first panel member so as not to interfere with said lateral adjustable movement of said substantially cylindrical outer member and said fastener with respect to said first panel member; a plurality of axially extending notches defined within sidewall portions of said substantially cylindrical body portion of said substantially cylindrical outer member so as to extend along sidewall portions of said substantially cylindrical body portion which are intermediate said first flanged end of said substantially cylindrical body portion and a second opposite end of said substantially cylindrical body portion; a plurality of elastically deformable cantilevered locking pieces integrally connected at one end thereof to said substantially cylindrical body portion of said substantially cylindrical outer member within the vicinity of end portions of said notches which are disposed toward said second opposite end of said substantially cylindrical body portion of said substantially cylindrical outer member so as to have free end portions thereof projecting obliquely outwardly, respectively, from said notches toward said first flanged end of said substantially cylindrical body portion of said substantially cylindrical outer member, wherein said free end portions of said locking pieces are axially spaced a predetermined distance from said flange portion of said substantially cylindrical body portion so as to permit said first panel member to be freely accommodated between said flanged portion of said substantially cylindrical body portion and said free end portions of said locking pieces with said free end portions of said locking pieces freely disposed out of contact with a second rear surface of said first panel member so as not to interfere with said lateral adjustable movement of said substantially cylindrical outer member and said fastener in said transverse direction relative to said first panel member, and wherein further said free end portions of said locking pieces have outer surface portion means for engaging inner sidewall portions of said second hole means defined within said second panel member such that when said axes of said first and second hole means of said first and second panel members are misaligned with respect to each other, and when said substantially cylindrical outer member and said fastener, mounted within said first hole means of said first panel member, are to be passed through said second hole means of said second panel member, said inner sidewall portions of said second hole means of said second panel member will force said substantially cylindrical outer member and said fastener to move laterally within said first hole means of said first panel member so as to permit said substantially cylindrical outer member and said fastener to be inserted through said second hole means of said second panel member; and a plurality of projections formed upon said second opposite end of said substantially cylindrical body portion of said substantially cylindrical outer member and projecting substantially radially inwardly within said axial bore and toward said longitudinal axis of said substantially cylindrical body portion; and an insertion member for disposition within said axial bore of said substantially cylindrical body portion of said substantially cylindrical outer member and for engaging said inwardly extending projections of said substantially cylindrical body portion of said substantially cylindrical outer member so as to expand said second opposite end of said substantially cylindrical body portion of said fastener radially outwardly with respect to a rear surface of said second panel member so as to engage said rear surface of said second panel member and thereby secure said second panel member to said first panel member as a result of said first and second panel members being clamped between said first flanged end of said substantially cylindrical body portion and said radially expanded second opposite end of said substantially cylindrical body portion.

8. A fastener system as set forth in claim 7, wherein: said insertion member has a flange portion provided at one end thereof for engaging and seating upon said flanged portion of said substantially cylindrical outer member when said insertion member is disposed within said axial bore of said substantially cylindrical outer member so as to radially expand said second opposite end of said substantially cylindrical body portion of said substantially cylindrical outer member.

9. A fastener system as set forth in claim 7, wherein: said substantially cylindrical outer member and said insertion member comprise one-piece plastic moldings.

10. A fastener system as set forth in claim 7, further comprising:
a plurality of slit means defined within said substantially cylindrical body portion of said substantially cylindrical outer member for dividing said substantially cylindrical body portion into flexibly expandable body sections.

11. A fastener system as set forth in claim 10, wherein:
three slit means are defined within said substantially cylindrical body portion of said substantially cylindrical outer member so as to divide said substantially cylindrical body portion into three equal body sections.

12. A fastener system as set forth in claim 7, wherein: said insertion member comprises a first body portion having a first diametrical extent which is substantially equal to the diametrical extent of said axial bore defined within said substantially cylindrical body portion of said substantially cylindrical outer member; a tapered end portion axially spaced from said first body portion and having a diametrical extent which is greater than the diametrical extent defined between said inner projections of said substantially cylindrical body portion when said substantially cylindrical body portion is disposed in a non-expanded state; and a second body portion interposed between and interconnecting said first body portion and said tapered end portion and having a diametrical extent which is less than said diametrical extent of said first body portion and which is substantially equal to said diametrical extent defined between said inner projections of said substantially cylindrical body portion when said substantially cylindrical body portion is disposed in said non-expanded state so as to accommodate said inner projections of said substantially cylindrical body portion within said non-expanded state whereby said insertion member is lockingly secured within said substantially cylindrical outer member.

13. A fastener system as set forth in claim 7, wherein: the diametrical extent of said first hole means defined within said first panel member is substantially greater than the diametrical extent of said second hole means defined within said second panel member so as to permit said lateral adjustment movement of said substantially cylindrical outer member and said fastener relative to said first panel member and thereby additionally permit said substantially cylindrical outer member and said fastener to be substantially axially aligned with said second axis of said second hole means of said second panel member whereby said substantially cylindrical outer member and said fastener can be inserted through said second hole means of said second panel member so as to permit said first panel member to be secured to said second panel member.

* * * * *